United States Patent
Greenspan et al.

(10) Patent No.: US 8,832,162 B2
(45) Date of Patent: Sep. 9, 2014

(54) METHOD AND SYSTEM FOR STORING, CATEGORIZING AND DISTRIBUTING INFORMATION CONCERNING RELATIONSHIPS BETWEEN DATA

(71) Applicant: Think Computer Corporation, Palo Alto, CA (US)

(72) Inventors: Aaron J. Greenspan, Palo Alto, CA (US); Jason F. Anderson, Palo Alto, CA (US); Ying Lei, Menlo Park, CA (US)

(73) Assignee: Think Computer Corporation, Mountain View, CA (US)

( * ) Notice: Subject to any disclaimer, the term of this patent is extended or adjusted under 35 U.S.C. 154(b) by 0 days.

(21) Appl. No.: 13/849,537

(22) Filed: Mar. 24, 2013

(65) Prior Publication Data

US 2013/0218835 A1    Aug. 22, 2013

Related U.S. Application Data

(60) Provisional application No. 61/615,325, filed on Mar. 25, 2012.

(51) Int. Cl.
*G06F 17/30* (2006.01)
(52) U.S. Cl.
CPC ...... *G06F 17/3071* (2013.01); *G06F 17/30182* (2013.01); *G06F 17/301* (2013.01)
USPC ..................................................... 707/825
(58) Field of Classification Search
USPC ..................................................... 707/825
See application file for complete search history.

(56) References Cited

U.S. PATENT DOCUMENTS

| | | | |
|---|---|---|---|
| 7,958,087 B2 | 6/2011 | Blumenau | |
| 8,010,532 B2 | 8/2011 | Chi et al. | |
| 8,069,450 B2 | 11/2011 | Beresnevichiene | |
| 2006/0179433 A1* | 8/2006 | Fair et al. | 717/174 |
| 2007/0056019 A1* | 3/2007 | Allen et al. | 726/1 |
| 2007/0283252 A1* | 12/2007 | Stuhec | 715/530 |
| 2008/0091549 A1* | 4/2008 | Chang et al. | 705/26 |
| 2010/0064377 A1* | 3/2010 | Farrell et al. | 726/28 |
| 2011/0246482 A1* | 10/2011 | Badenes et al. | 707/748 |
| 2011/0307792 A1 | 12/2011 | Deluca | |

OTHER PUBLICATIONS

Bartolini, I., & Ciaccia, P. (2009). Integrating semantic and visual facets for browsing digital photo collections. In Proceedings of the Italian Symposium on Advanced Database Systems (SEBD). Camogli, Italy.*
Bloehdorn et al., TagFS—Tag Semantics for Hierarchical File Systems, Proceedings of I-KNOW '06, Graz, Austria, Sep. 6-8, 2006.*
Bobbarjung et al., Improving Duplicate Elimination in Storage Systems, ACM Transactions on Database Systems, vol. V, No. N, Apr. 2005.*
Gifford, D. K., Jouvelot, P., & Sheldon, M. A. (Sep. 1991). Semantic file systems. In ACM SIGOPS Operating Systems Review (vol. 25, No. 5, pp. 16-25). ACM.*

(Continued)

*Primary Examiner* — William Spieler (57) ABSTRACT

A method and system for storing, categorizing and distributing information concerning relationships between data that involves the use of tags in place of traditional, mutually-exclusive file folders by querying any number of servers for information regarding a tag, associating the tag with data on an electronic device, and suggesting other tags that might be relevant as well.

23 Claims, 11 Drawing Sheets

(56) References Cited

OTHER PUBLICATIONS

Heymann, On the Use and Abuse of Collaborative Tagging Data, 2006.*

Ilaria Bartolini, Paolo Ciaccia, Automatically Joining Pictures to Multiple Taxonomies (Extended Abstract). SEBD 2010, 266-273.*

Marchetti, et al. (May 2007). Semkey A semantic collaborative tagging system. In Workshop on Tagging and Metadata for Social Information Organization at WWW (vol. 7, pp. 8-12).*

Sen, et al., (2006). tagging, communities, vocabulary, evolution. In Proceedings of CSCW 06. ACM.*

Voit, K., Andrews, K., & Slany, W. (2011). TagTree Storing and re-finding files using tags. In Information Quality in e-Health (pp. 471-481). Springer Berlin Heidelberg.*

Wayne State University, Visual Resources Collection Faculty Workshop, Aug. 2009.*

Superuser.com, How to make new file permission inherit from the parent directory?, Jun. 2010, accessed Sep. 10, 2013.*

Seltzer, Margo and Murphy, Nicholas, "Hierarchical File Systems are Dead," Unpublished Journal Article, May 2009, http://www.eecs.harvard.edu/margo/papers/hotos09/.

Perez, Sarah, "Is Gmail Giving Up on Tagging?", News Article, Apr. 8, 2010, http://readwrite.com/2010/04/08/is_gmail_giving_up_on_tagging.

Grimaldi, Sean, "The WinFS Files: Divide et Impera," Microsoft Developer Network Article, Dec. 2005, http://msdn.microsoft.com/en-us/library/aa480690.aspx.

Wikipedia: WinFS, http://en.wikipedia.org/wiki/WinFS.

Yang, Kuiyuan, et al, "Tagging Tags", Proceedings of the ACM Multimedia 2010 International Conference, Oct. 25-29, 2010, ISBN 978-1-60558-933-6/10/10, pp. 619-622.

Heckner, Markus, et al., "Tagging Tagging: Analysing User Keywords in Scientific Bibliography Management Systems", Journal of digital information (JODI) 9, 2008.

Kroski, Ellyssa, "The Hive Mind: Folksonomies and User-Based Tagging", 2005, Previously Accessible at http://infotangle.blogsome.com/2005/12/07/the-hive-mind-folksonomies-and-user-based-tagging/, Accessed from Cached Version Mar. 25, 2013.

Schmitz, Patrick, "Inducing Ontology from Flickr Tags", Proceedings of the Collaborative Web Tagging Workshop (WWW'06), 2006.

Tanasescu, Vlad and Streibel, Olga, "Extreme Tagging: Emergent Semantics through the Tagging of Tags", International Workshop on Emergent Semantics and Ontology Evolution Korea; 2007.

Walfish, Michael, et al, "Untangling the Web from DNS", Proceedings of NSDI '04, pp. 225-238, San Francisco, CA, USA, Mar. 2004.

Quora, http://www.quora.com.

* cited by examiner

Figure 1

BROWSER®

◁ Back

Home

*DOCUMENT*     *[Page] i* amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Lorem ipsum dolor sit amet, consectetur adipisicing elit, sed do eiusmod tempor incididunt ut labore et dolore magna aliqua. Ut enim ad minim veniam, quis nostrud

[ Go △ ]

Books in Lat|    S106
Books in Fake Latin
Books in Latin
Books in Latin America
Books in Latvia    S108

―――S116―――
(1) Judi's Collection 2 (!)    (∞) Super Cool (!)
(∞) Favorite Books (!)    (n) Widget Corp. (!)

Figure 2

Save

| Name | Multi-Colored Animals |
|---|---|
| Type(s) | 🖼 Writing  🖼 Spreadsheet |
| Created | March 1, 2013 at 10:00 A.M. by Joe Smith |
| Tags | Pink G| |

Pink Giraffes
Pink Gorillas
~S106

▶  ~S112

(1) Judi's Collection 2   (∞) Super Cool
(∞) Favorite Books   (n) Widget Corp.
~S116

You may also want to tag this with...
(∞) Giraffes   (∞) Very Tall Animals
(1) Joe's Secret Materials
~S118

OK
Cancel

Revision History
Today at 3:32 P.M.   Rev. 2
3/1/2013 at 10:00 A.M.   Rev. 1

Medical

① Only you can see this tag and files associated with this tag.

| Type | Description | Location |
|---|---|---|
| 📝 | Notes from October 7, 2012 allergist visit | Here (SSD Storage) |
| 📝 | Notes from October 7, 2012 allergist visit | Here (SSD Storage) |
| 📅 | June 30, 2013 at 10:00 A.M.: doctor's appointment | Widget Corp. Server C |
| ✉ | E-Mail from Dr. Alyssa Chu: "pollen season" | Widget Corp. Server A |
| 💬 | Instant Messaga to Dr. Alyssa Chu: "hi dr. chu" | Widget Corp. Server A |
| 📊 | Widget Corp. Health Insurance Options 2012 Presentation | Widget Corp. Server B |
| 💵 | January 31, 2013 Payment to HealthNet for $295.01 | ThinkLink |
| 💵 | February 29, 2013 Payment to HealthNet for $295.01 | ThinkLink |
| ✉ | E-Mail from Bob: "rising health costs" | ThinkLink |
| 🌐 | Web Site - HealthNet - http://www.health.net | Internet |

○ Sort by Name
○ Sort by Type
● Sort by Usage
○ Sort by Location

[ Relate Tags... ]
[ Permissions... ]

Related to Medical
ⓝ Allergies
ⓝ Cancer
ⓝ Doctors
ⓝ Exercise
ⓝ Fitness
ⓝ Health Insurance
ⓝ HealthNet
ⓝ Preventative Medicine

METHOD AND SYSTEM FOR STORING, CATEGORIZING AND DISTRIBUTING INFORMATION CONCERNING RELATIONSHIPS BETWEEN DATA

CROSS-REFERENCE TO RELATED APPLICATIONS

This application claims the benefit of U.S. Provisional Application No. 61/615,325, filed 25 Mar. 2012, entitled "Method and System for Storing and Categorizing Relationships Between People and Data," which is incorporated in its entirety by this reference.

TECHNICAL FIELD

This invention relates generally to the computer operating system field, and more specifically to a new and useful method and system for storing, classifying, and distributing information about relationships between computer data files.

BACKGROUND

For decades, personal computers have stored information using a hierarchical file/folder metaphor, in which pieces of information, or files, have been categorized through their placement in folders (also referred to as "directories") with concise names. Some of the earliest computer operating systems that have long since fallen out of use, such as CP/M, used names for files and folders alike that were restricted to a syntactical format involving at most eight characters, followed by a period (or "dot"), followed by at most three more characters (the "extension") intended to represent the type of the file. For example, a file called COMMON.DOC was (and to some extent still is) often referred to as a having a ".DOC" file type, somewhat opaquely indicating that it is intended to be used by Microsoft Word. With this conventional, limiting and hierarchical system, unlike a traditional filing cabinet, it is nonetheless possible to store a folder within another folder recursively essentially ad infinitem. Yet many limitations exist: among them, the fact that it is not possible to store the exact same file in two or more "folders" at once, which might be helpful for categorization purposes, without making a duplicate, asynchronous copy of that file.

The problem of addressing files has traditionally been handled through the use of special characters to denote logical relationships. On UNIX operating systems, the forward-slash character ("/") denotes that the subsequent string of characters is a file or folder that is a subset of the folder or storage device corresponding to the preceding string of characters. A typical UNIX file path therefore might be "/etc/httpd/conf/httpd.conf", with / representing the root node or storage device. On MS-DOS and Windows systems, this character has traditionally been a backward-slash ("\"), giving rise to file paths such as "C:\WINDOWS\SYSTEM32\KERNEL32.DLL", with C:\ representing the root node or storage device. Apple Macintosh systems prior to Mac OS X used two sets of colons ("::"), with file paths such as "Macintosh HD::Documents::My Letter.doc". Mac OS X, built on the FreeBSD UNIX kernel, now uses UNIX file paths.

The implication that digital information must obey physical laws such as conservation of matter—meaning that a file, like a chair, might only be in one place or another at any given point in time—has had unintended consequences that have afflicted millions of computer users. Unintentionally renaming or moving a "system file," i.e. a file integral to the proper functioning of core system software, might render a computer completely inoperable and require hours of maintenance to fix. Another consequence of mutually exclusive file addressing involves naming conventions: naming a revision of a legal document pertaining to multiple issues might require an awkward and overly verbose file name such as "March-31-client-X-Johns-sales-revision-3-with-changes-about-cameras.docx" so that it is likely to appear in future searches for data pertaining to sales figures, John, and cameras. In other words, crucial system files are not identified to operating systems by their crucial nature—but rather by an arbitrary string that is hard coded into a piece of software corresponding to a particular location—nor are user files identifiable to users by the definition of any particular attributes except clumsy names. Yet another consequence of the over-dependence upon special file names is that by changing the data at such a hard-coded address (i.e. file name), in cases where a computer does not stop functioning outright, it is also possible to insert malicious software.

"Tags," also sometimes referred to as "labels," have recently gained a foothold on the internet as an improved method of categorizing e-mail messages, blog posts, and other disparate types of information stored on remote servers. Nonetheless, tags are not found at the lower operating system or file system levels, where files accessible through an operating system kernel are organized on a physical data storage medium, or disk. Nor are tags found within one program or web site typically usable on another. They exist for all practical purposes only in independent silos.

The organization of large numbers of files on a physical storage medium presents challenges that have serious implications for software development and use. For example, many computer software applications make use of dynamic linked libraries, or collections of commonly-used software functions, that can undergo numerous revisions by programmers throughout the lifespan of a given computer system. Some libraries, which frequently have multiple versions, must also be offered in 32-bit and 64-bit editions simultaneously to account for different types of microprocessor architectures available in modern computers. File paths are the sole identifier that modern filesystems use to distinguish between types of files, and only one file with a given name can exist in a given folder. Though each revision and type of software library must be treated as completely distinct in order for other inter-linked programs to function properly, confusion frequently reigns (often causing software crashes) since completely distinct versions and/or editions of libraries can have confusingly similar, and sometimes identical, file names.

Compounding the failure to distinguish between microprocessor platforms and revision numbers, modern filesystems are unable to quickly find files made by the same person or employer, let alone those that meet more abstract search criteria, such as files made by any company located in the greater London area. The simple fact that there are only two possible types of data (namely, files and folders) on popular filesystems ranging from FAT32 to NTFS to ZFS to HFS to CDFS explains why such limitations persist even on what are otherwise considered to be "cutting-edge" filesystems.

The application layer that associates certain file name suffixes with specific programs is itself extremely error-prone and confusing. For example, OpenOffice, the open-source equivalent to Microsoft Office, can read and edit .DOC, .XLS, and .PPT files—extensions that originated with Microsoft software—but if OpenOffice is installed after Microsoft Office, it may re-assign itself to those file types, leaving Microsoft out of the equation on that particular computer. While this may be desired behavior in some instances, it may also be highly undesired at times. Today, there is no concept of a word processing document according to an operating system; only that of a .DOC extension that must either correspond to one software application or another.

Using traditional file system hierarchies, files and folders also fail to persist across multiple computer devices, including multiple devices that belong to the same individual. In general, this means that information cannot easily be made available to groups of people without using a software application running on top of the operating system as an intermediary distribution mechanism (e.g. Microsoft SharePoint, Lotus Notes, web browsers, etc.) For a given individual, this major drawback of today's operating system software also necessitates regular data transfer and file/folder synchronization, which is increasingly time-consuming and error-prone as more devices become involved.

Tags fill another gap left by traditional file systems, involving data that does not need (from the perspective of an average user) a proper name, such as a particular photograph in a set of many family photographs taken in rapid succession. Photographs stored on traditional storage media are usually assigned meaningless names such as DSC_1398.JPG, which convey no meaning to the photographer or viewer whatsoever, aside from the largely irrelevant fact that the photograph is the $1,398^{th}$ image to be captured by that camera since its counter was last reset.

A need exists for a new type of operating system that can better organize real-world data, e.g. contact records, events, financial documents, medical records, e-mail messages, personal letters, legal notices, software code, photographs, video, sound, music, and abstract data sets, among others, and then relate those pieces of data to each other through the use of tags. Until such a system exists in the commercial marketplace, there will also be a need for a transitional technology that moves large volumes of data from existent operating systems—those based upon arbitrary, independent hierarchies of folders—to new systems that employ intuitive labels not required to be mutually exclusive, and that can easily persist across devices and applications.

Tags have often been used on web sites. However, they have not been employed as the main channel of accessing information in any major operating system, let alone a channel that makes inherent use of the internet, due to several limitations in the existing implementations, which are addressed by this invention.

A need further exists for a new method and system for associating data with tools, such as software applications, that are capable of working with that data. For example, while it is easily possible to write an essay without the use of a computer by using a pencil on the left side of a piece of 8.5"×11" paper, and then to paint a picture with a paintbrush and colored paints on the right side of that same page, accomplishing a similar feat through the use of a computer is surprisingly far more difficult. The latter process is a cumbersome exercise involving the creation of two to three files in two to three different software applications: the essay, in a word processor; the painting, in a drawing program; and the "page" itself, in a desktop publishing application capable of uniting the other files according to particular layout specifications. Therefore, while the technology employed for data storage and organization today is extremely functional and widespread, it still lacks the ability to quickly assemble and categorize information, and later, to help the user find that information. There is therefore a need in the operating system field, and the file system field specifically, to create a new and useful method and system for storing, categorizing and distributing relationships between data. This invention provides such a new and useful method and system.

SUMMARY

The method for storing, categorizing and distributing information concerning relationships between data of the preferred embodiment includes creating and storing independent lists of system-defined and user-defined tags accessible at the operating system level, requiring the assignment of at least one tag to each new piece of information written to disk throughout a user session, optionally suggesting the assignment of additional tags to each new piece of information written to disk based upon tags that have been previously assigned to similar pieces of information, allowing the user to choose which tags to make public or private to various groups of people, allowing the user to suggest new tags for remotely-stored data, allowing the user to endorse (vote up) or discourage (vote down) tags that have already been applied to data generated elsewhere, requiring the user to perform authentication steps in order to use certain tags with restricted permissions, allowing tags to be linked to other tags in a variety of manners (e.g. equal, equivalent, subset, superset, null, etc.), and automatically synchronizing tags and their corresponding data across a network of interconnected computers. The method functions to allow a user of the embodiment to keep track of information in a non-hierarchical and cross-indexed manner such that searching for information is both faster than with conventional means and more likely to lead to either the immediately desired data, or data closely related to the subject of a search query. In the preferred embodiment, the method allows individuals to keep track of their real-world relationships to one another through the use of tags that correspond to commonly-used terms in the real world, e.g. client, vendor, buyer, merchant, etc. In another embodiment, the method provides an accurate and verified record of a person's career, educational history or credit history through the authenticated and selective application of restricted tags. In another embodiment, the method provides users with an ad-hoc relational database storage engine, by using tags to define field templates, so that data can be grouped together without need for any programming. In another embodiment, the method links previously disparate systems reliant on independent software applications, such as corporate office calendars and corporate receipt tracking software, through the use of tags that correspond to meeting locations and expense types. In another embodiment, the method serves as an electronic communications medium through the augmentation of message data with message type tags. Most preferably the user can access the data storage system through a personal computer, a "thin client" computer (such as a tablet) connected to a server via the internet, or a mobile device.

BRIEF DESCRIPTION OF THE FIGURES

The accompanying drawings, which are included to provide a further understanding of the invention and are incorporated in and constitute a part of this application, illustrate embodiment(s) of the invention and together with the description serve to explain the principle of the invention. In the drawings.

SPECIFICATION

In some embodiments herein, a flexible data classification method is disclosed. Such a data classification method may be used to index newly-created information, existing information on a device belonging to an entity, or through the use of a network, existing information on a different device belonging to a different entity. A data synchronization mechanism is also disclosed as an intermediate method necessary on some devices not capable of using the flexible data classification method without significant modification by the device manufacturer.

In one example, a digital copy of IRS Form 1099-DIV from a hypothetical brokerage firm called "Stocks Plus" may be saved on a device with tags chosen by the user entitled "2013 Taxes," "Stocks Plus," and "IRS" so that the document could be recalled later by searching for "2013 Taxes," "Stocks Plus," "IRS," or slight variations on these terms. Should another digital copy of a tax form also be tagged with "Stocks Plus," such as an IRS Form 1099-DIV from a prior year, the "Stocks Plus" tag may provide a visual indication, within the tag itself or elsewhere on a display, of the arithmetic sum of the numeric amounts of money contained within those documents. Or, if specific fields within the tax form are tagged with their respective field names, the values only in those tagged fields might be totaled. In this manner, any tag may serve to facilitate arithmetic operations on associated underlying numeric data.

In another example, the digital copy of IRS Form 1099-DIV may arrive pre-loaded with tags chosen by the document's creator to assist the recipient in categorizing the data for later retrieval. The user may be given an opportunity to accept, reject, or augment the pre-loaded tags with tags more relevant to that particular user.

In yet another example, the client device may automatically suggest tags relevant to a digital copy of IRS Form 1099-DIV downloaded from the web site of the brokerage firm by relying upon rules associating the brokerage firm's domain name(s), and meta data contained within the digital document, with specific tags available to the end user.

The classification mechanism may be used to de-couple content from file format information. Two files containing the exact same content with the exact same file name, but represented on disk in different formats, may be differentiated by system-defined tags indicating file format.

The classification mechanism may also be used to centralize views of vast amounts of information stored in different locations on different devices. For example, a law firm with offices in New York, Chicago and London may store information pertaining to clients on servers physically located in each office, with data pertaining to a specific client matter stored on each server. Using the classification mechanism, the law firm's employees may automatically (without the need for manual indexing) view all of the information pertaining to the client matter on one device without regard to the location of the data, the type of data, or the tool used to create the data.

DETAILED DESCRIPTION

The following description of the preferred embodiments of the invention is not intended to limit the invention to these preferred embodiments, but rather to enable any person skilled in the art to make and use this invention.

1. Method for Storing, Categorizing and Distributing Information Concerning Relationships Between Data As mentioned above and as shown in FIG. 1, the method for storing, categorizing and distributing information concerning relationships between data 100 includes creating and saving data on a desktop, laptop, mobile, or other client device S102 and determining whether that file system supports tag-based storage S104.

Figure 1:
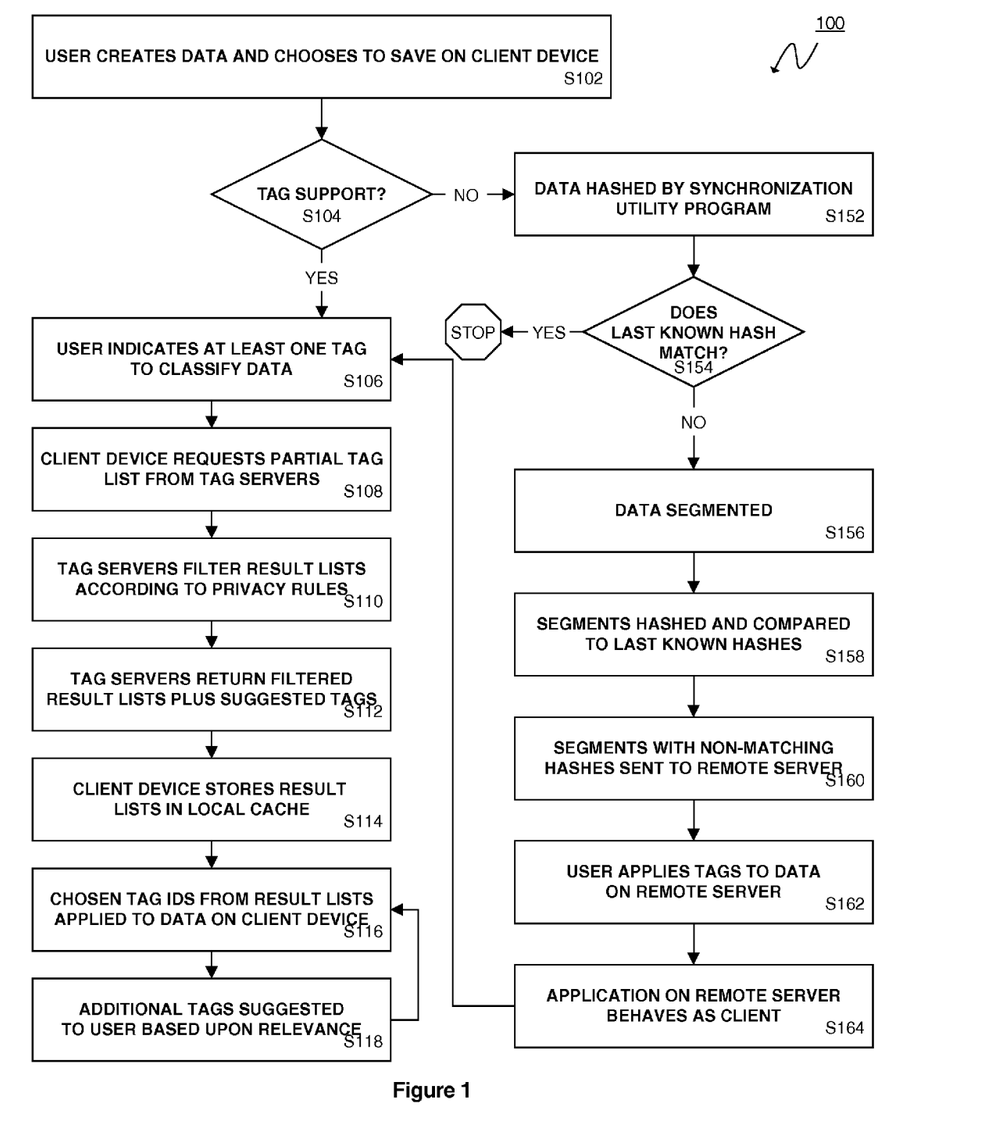
FIG. 1 is a flowchart illustrating a method for storing a computer file on a device through the use of tags.

If the device's file system does natively support tag-based storage, then the process continues by the user indicating at least one tag to classify the data with S106, the client device requesting a partial tag list from tag servers corresponding to the supplied string S108, the tag servers filtering the resulting list according to privacy rules associated with each tag S110, the tag servers returning filtered result lists to the client device, plus any additional suggested relevant tags S112, the client device optionally storing these results in a local cache for future use S114, the user choosing the proper tag from the results and the client device storing the user-chosen tag identification numbers (IDs) in association with the given data S116, and the client device suggesting to the user any additional relevant tags that were offered by the tag servers in the result lists S118. Steps S116 and S118 can repeated as many times as necessary, with the user applying additional tags, and the client device suggesting new related tags each time.

If the operating system does not support tag-based storage, then it is necessary to use another device's operating system or another application that does support tag-based storage as an intermediary mechanism. In the preferred embodiment, the process continues by computing a hash of the data S152 and comparing the hash to the last-known hash of the data (if available) on a remote server S154. If the hashes match, the data has not changed since the last synchronization operation, and so the process stops. If the hashes do not match, or no prior hash exists on a remote server, then the process continues by segmenting the data on the client device S156, comparing the hashes of each segment on the client device to corresponding hashes of segmented data on a remote server S158, transferring any segments with non-matching hashes or no prior hashes to a remote server S160, and applying tags to data on a remote server S162 such that a software application running on a remote server handling these intermediate steps behaves as would a client device S164.

Figure 3:
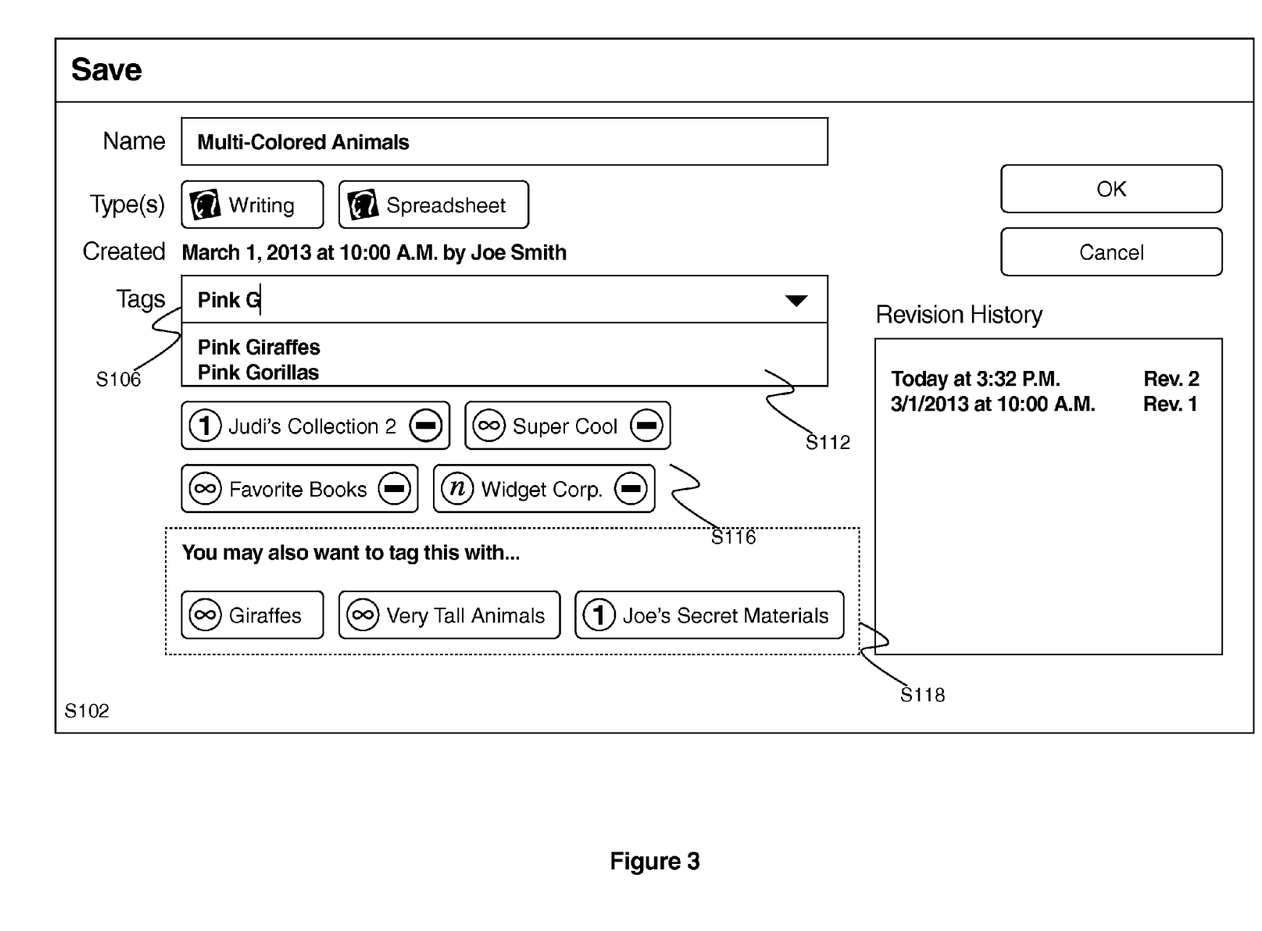
FIG. 3 is a diagram depicting a sample user interface that a person might employ to save and label data by applying tags.

Step S102, which involves the creation of new digital data on a device or the modification of existing digital data, as well as the user's subsequent choice to save that data as depicted in FIG. 3, serves to define a finite set of information for labeling with a tag. Identifying a piece of data might be accomplished by starting a new text document, taking a photograph with a digital camera, visiting a web site, saving a file, working within a mobile application, or performing some other kind of task that involves the creation or manipulation of digital information. Each type of data, e.g. text, photograph, web site, etc., would in the preferred embodiment correspond with a system-defined tag for that data type, which could in turn be associated with software tools capable of editing the data. Unless the given device already natively supported the method and system described herein, in which case the data's "location" in a specific folder would no longer be relevant or necessary, the user would be prompted to choose a location in which to store the data.

Step S104, which involves the determination as to whether or not the local file system natively supports tag-based addressing, functions to bypass certain steps that are unnecessary on devices with native tag support, but crucial for devices that lack such support. Devices without native tag support require an intermediary device or software application that does support tags in order for them to be applied. The introduction of a second device into the system necessitates a data synchronization and transmission process, which is described by steps S152 through S164.

Figure 2:
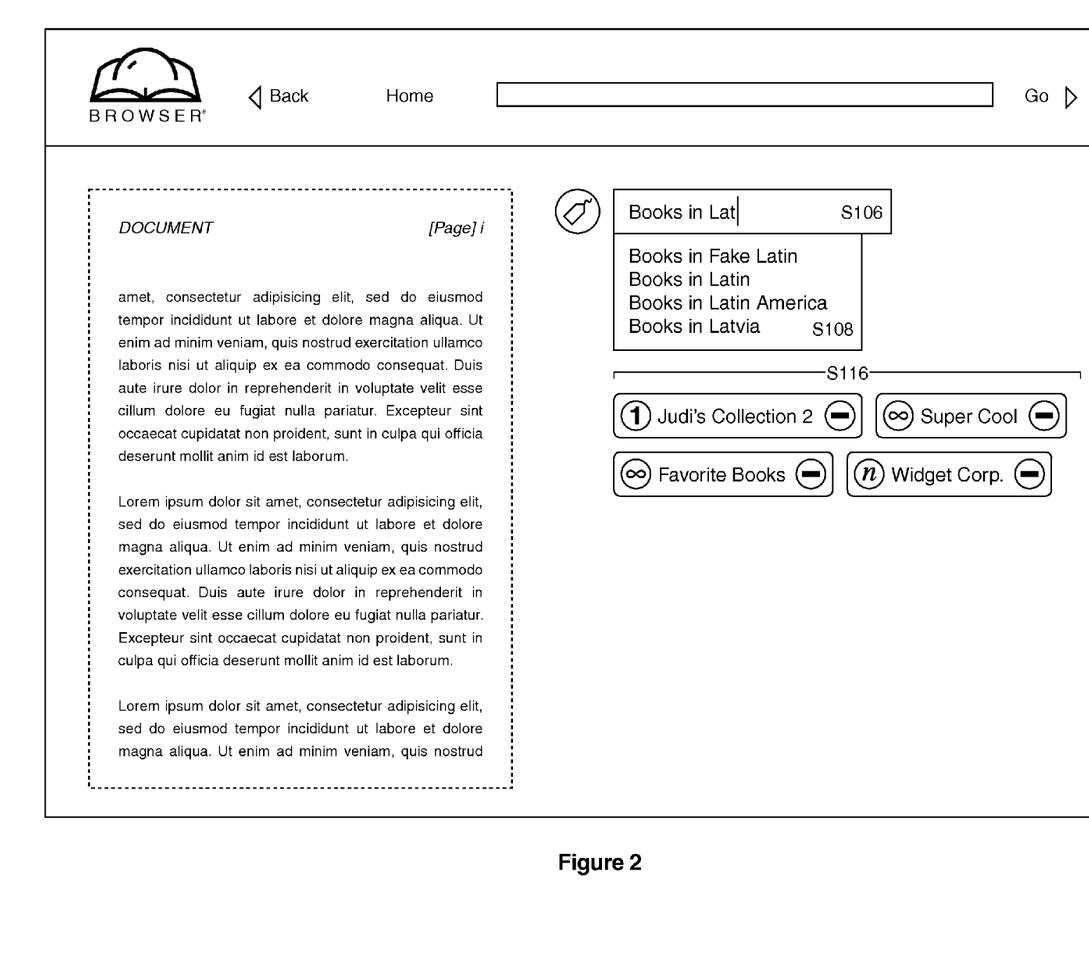
FIG. 2 is a diagram depicting a sample user interface that a person might employ to label data contained in a web browser with tags.

Step S106, which involves indicating a specific tag that can be used to classify data, (typically through the use of a keyboard, voice recognition, or some similar device), functions to provide a query string that can be transmitted to any number of servers, as shown in FIG. 2 and FIG. 3.

Step S108, which involves the client device requesting a partial tag list from any number of servers, functions both to limit the computational load on the servers since the complete tag list may be very large, and to limit the number of results that is returned back to the client device based upon the query string provided. For example, as shown in FIG. 2 and FIG. 3, the aggregate result list only shows tags that begin with the same characters as the provided query string. Limiting the number of results transmitted over the network is advantageous insofar as there may be a charge for bandwidth used by servers, and insofar as a large result set might overwhelm the end user with irrelevant information.

Step S110, which involves the tag servers filtering their respective result lists according to permissions associated with each tag, functions to ensure that results are tailored to the particular individual making the request. Some tags might be used to classify information that is private, or the classification itself might be private. It is therefore necessary to filter the results according to privacy rules stored on the servers before being transmitted back to the client device. Tags might be limited to one particular user (the creator of the tag), a group of users possibly corresponding to workplace or employer, or not limited at all, in which case any user would be able to apply the tag to any content. Each level of visibility might correspond to a different visual icon or color cue so that users could rapidly identify the privacy level of a given tag. Tags might also have an optional property forcing other tags or corresponding content to inherit that tag's privacy settings, so that a specific public tag, when applied, would automatically make the underlying content public. Such a setting may also correspond to a specific visual icon or color. Rules embedded in tag servers may govern conflicts between differing privacy rules associated with different tags, causing some tags' rules to override others.

Step S112, which involves the transmission of the filtered result lists back to the client device, functions to complete the query between the client and the server.

Step S114, which involves the client device storing the aggregated, filtered results in a local cache, functions to allow the client device to continue operating with a greater degree of speed and reliability. In the event that the network is unavailable, severing the conduit to remote tag servers, the client device may use the local cache to perform lookups of tag unique identifier information, instead of attempting to query the inaccessible number of servers. Even if the network is technically available, it may be slow or unreliable, and so it may be advantageous to use the local cache to perform faster queries without any network latency.

Step S116, which involves the application of the chosen tag unique identifiers to an underlying piece of data, functions to store on disk (and/or in memory) the user's desired classification of the data for the long term. Since tags can be applied to more than one piece of information, and each piece of information can be associated with more than one tag, tags are the most efficient way to represent complex information relationships. The unique identifier underlying each tag can be hidden from view of the user through the operating system's user interface, even if the unique identifier is ultimately the key piece of information stored for future retrieval. Once applied, tags may also be disassociated with data through the use of an icon indicating deletion, as depicted in the example user interface in FIG. 2.

Step S118, which involves the suggestion of additional tags to the user based upon those tags previously chosen, serves to assist individuals in classifying information properly and completely. Suggestions might be based upon other tags already chosen for a given piece of data, or based upon the most frequently used tags over a longer period of time in the past, either for a particular individual, or for a group of individuals. Once a tag has been applied to one piece of data, it is more likely to be applied again to another.

Step S152, which involves computing an overall hash of the data in question, functions to avoid unnecessary synchronization and data transmission. The synchronization process operates by computing an overall hash of the data to be transmitted and comparing it with the last-known hash of the corresponding data on the remote server, if any.

Step S154, which involves comparing the hash on the client device to the hash on the server, halts the process if no additional synchronization work is necessary.

Step S156, which involves segmenting the data, functions to further reduce the need for any unnecessary data transmission. Given that some data files, such as videos, can be several gigabytes in size, it is far more efficient and cost-effective to transmit only the segments of a file actually modified, rather than the entire file itself.

Step S158, which involves comparing the hash of each segment on the client device to the hash of each segment on the server, again functions to avoid unnecessary synchronization and data transmission. Upon detecting a difference between the segment hash string on the local computer and the segment hash string on the remote server, the process marks those segments with differing hashes for transmission.

Step S160, which involves transmitting certain segments to a remote server, functions to ensure that data on the remote server is synchronized with data on the client device. Transmission of data may be accomplished through a variety of standard data transmission mechanisms such as HTTP, FTP, AFP, and encrypted if necessary.

Step S162, which involves the user applying tags to data on a remote server, functions to substitute for the client device not being able to support tag associations itself.

Step S164, which involves an application on the remote server behaving as a client, starts the process beginning with step S106.

Figure 4:
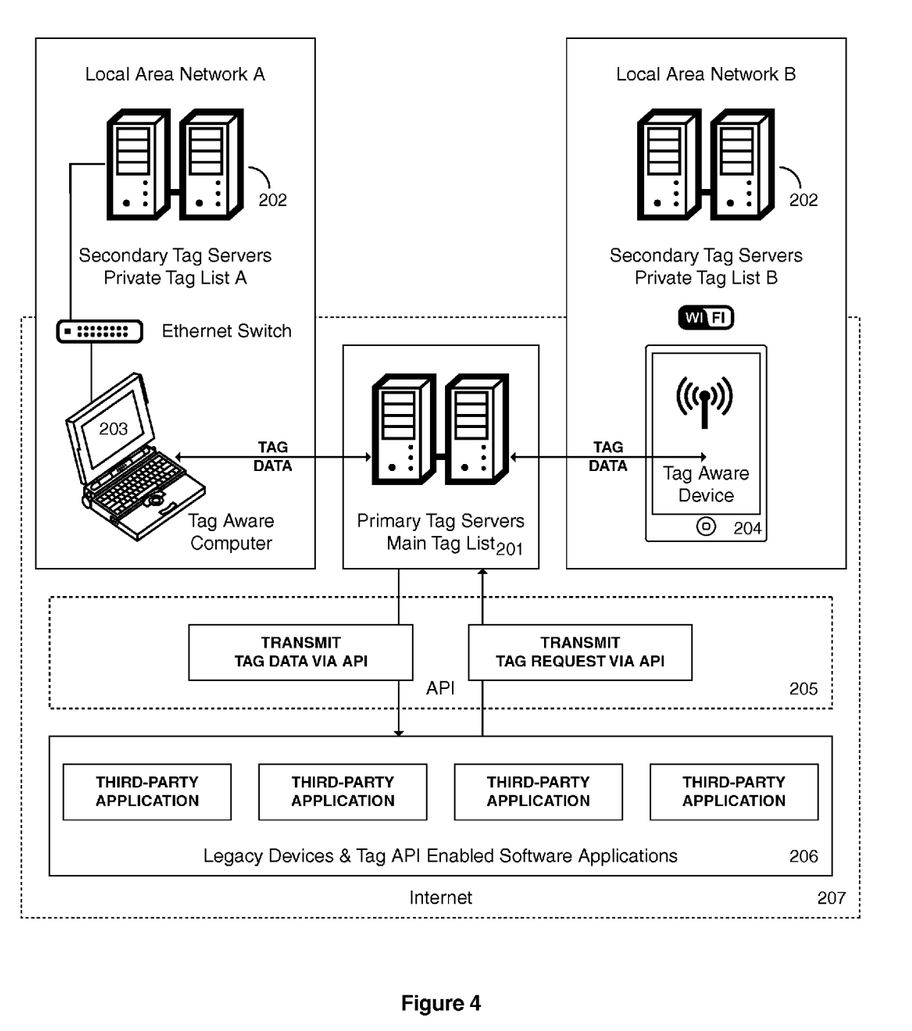
FIG. 4 is a diagram depicting a system involving a computer network arrangement with several servers and client devices.

2. System for Storing, Categorizing and Distributing Information Concerning Relationships Between Data As shown in FIG. 4, the system 200 for storing, categorizing and distributing information concerning relationships between data of the preferred embodiment includes primary tag servers 201, secondary tag servers 202, at least one client device natively capable of associating tags with data 203, other tag aware devices, such as mobile devices 204, an Application Programming Interface (API) 205, and legacy devices as well as tag API enabled software applications 206. Many of these devices work while connected to a globally interconnected network of computers, i.e. the internet, 207.

The primary tag servers 201 of the preferred embodiment function as an accessible central node that stores a list of tags in a relational database for the general public as well as registered users to reference.

The secondary tag servers 202 of the preferred embodiment function as accessible private nodes that store lists of tags in relational databases for only specific registered users to reference, such as employees of a particular company, or students at a university.

The tag aware devices 203 and 204 of the preferred embodiment functions as a client device that can make direct queries to primary and secondary tag servers 201 and 202 without the use of additional application software.

The API 205 of the preferred embodiment functions as a bridge between legacy devices 206 that cannot make direct queries to primary 201 and secondary 202 tag servers, and between tag enabled applications 206 and primary 201 and secondary 202 tag servers.

The API 205 of the preferred embodiment functions as a bridge between legacy devices 206 that cannot make direct queries to primary 201 and secondary 202 tag servers, and between tag enabled applications 206 and primary 201 and secondary 202 tag servers.

Figure 5:
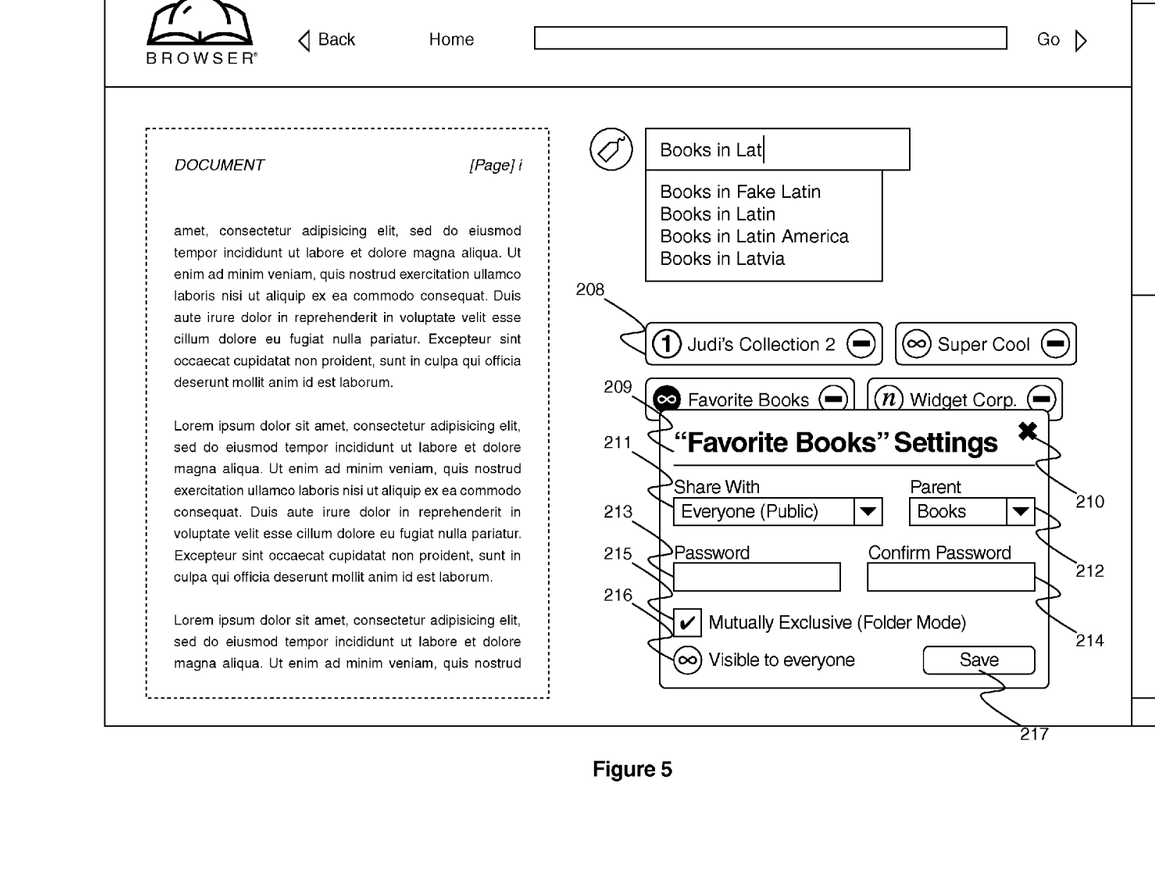
FIG. 5 is a diagram depicting a sample user interface that a person might employ to set privacy and other settings related to a particular tag.

As depicted in FIG. 5, in the preferred embodiment, the tags themselves may be represented to the user by rounded rectangles containing the name of the tag 208, along with icons representing privacy settings and disassociation capability. Clicking on the privacy icon may reveal a dialog box 209 corresponding to privacy and other settings for that particular tag that can be dismissed by an icon representing exit functionality 210. The privacy rule itself may be defined by a list of groups to share with, including the general public 211, that updates the privacy icon 216. Settings regarding the tag's hierarchical placement may also be governed by controls in the dialog 212, such as which tag is the parent of the present tag. A password may also be set restricting access to data associated with the tag 213, which can be confirmed within the same dialog or a different dialog 214 to ensure accurate typing since password fields are typically masked. Other settings such as mutual exclusion 215 may be configurable through the dialog pertaining to the tag. Changes to the settings may be saved through the use of a button 217 that commits the changes to long-term storage through the use of a request to the proper tag server.

Figure 6:
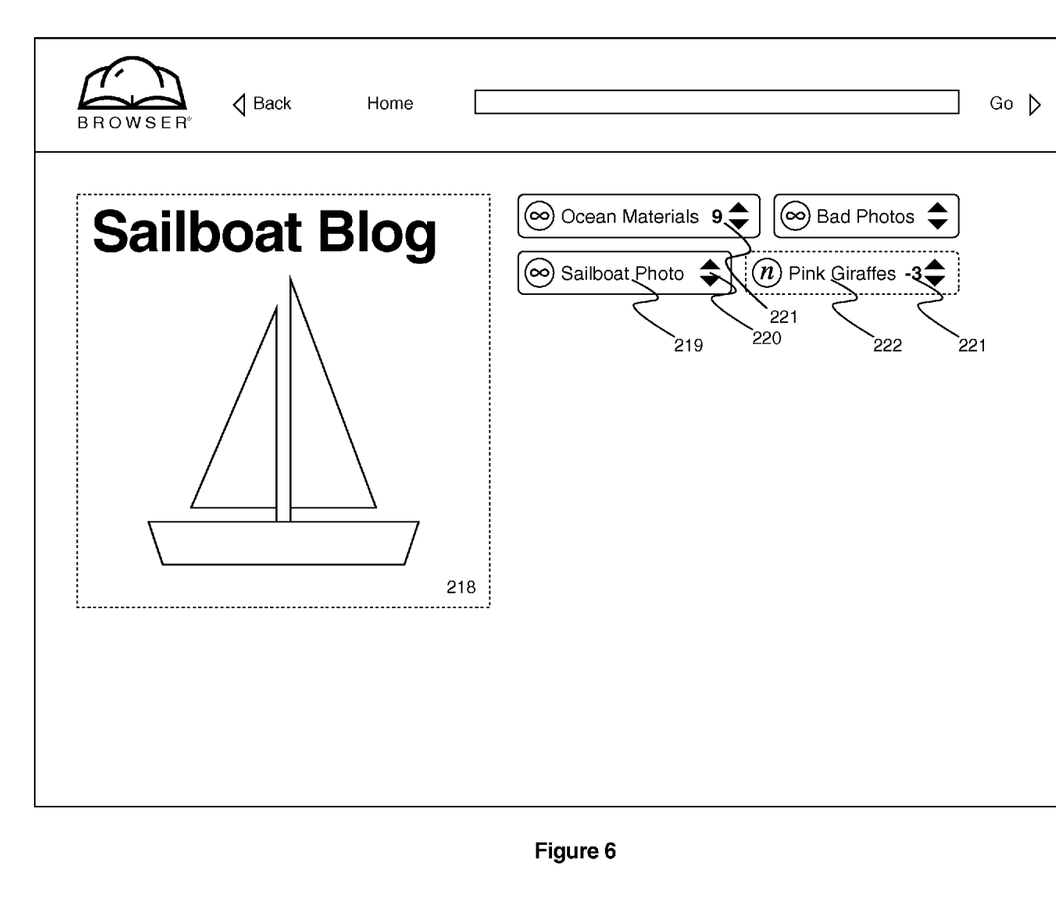
FIG. 6 is a diagram depicting a sample user interface that a person might employ to vote tags designated by other individuals up or down.

As previously discussed, and as depicted in FIG. 6, a tag or multitude of tags 219 may be applied to remote content authored by a different individual than the present user 218. On the part of the content's author, it may be desirous to gauge applicability of various tags by enabling voting controls 220 for those tags 219. On the part of the content's author, it may further be desirous to display the number of votes recorded in either direction for each tag with a counter 221. In the event that any tag receives a large number of votes in either direction, it may also be desirous to alter the appearance of that tag 222 to encourage or discourage attention, or even remove the tag's association with the content entirely beyond a certain user-defined threshold.

Figure 7:
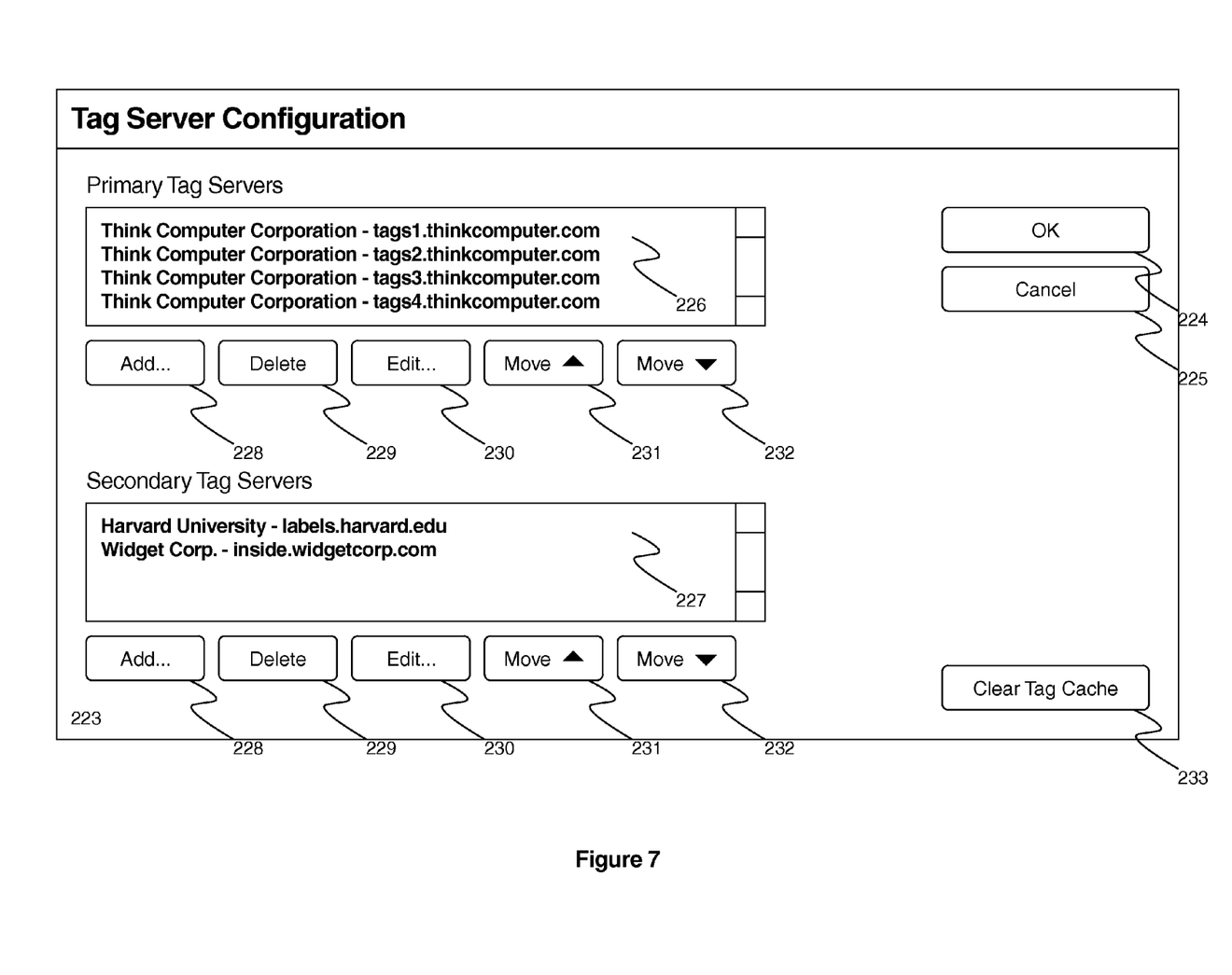
FIG. 7 is a diagram depicting a sample user interface that a person might employ to configure any number of tag servers on a client device.

As shown in FIG. 7, a client device may be configured to query any number of tag servers via a user interface 223 with standard "OK" 224 and "Cancel" 225 response buttons that write the choices to disk and/or memory or discard them, respectively. The user interface may divide servers into primary 226 and secondary 227 designations, and may optionally hard-code or provide default selections for the primary servers. The user may have the ability to add 228, delete 229, edit 230, re-order upward 231 and re-order downward 232 servers in the primary or secondary tag server lists. Servers may be designated by IP address, DNS hostname, or any other appropriate network addressing mechanism. The user interface may also present a method for manually clearing the local tag cache 233 rather than simply allowing outdated cache entries to expire.

Figure 8:
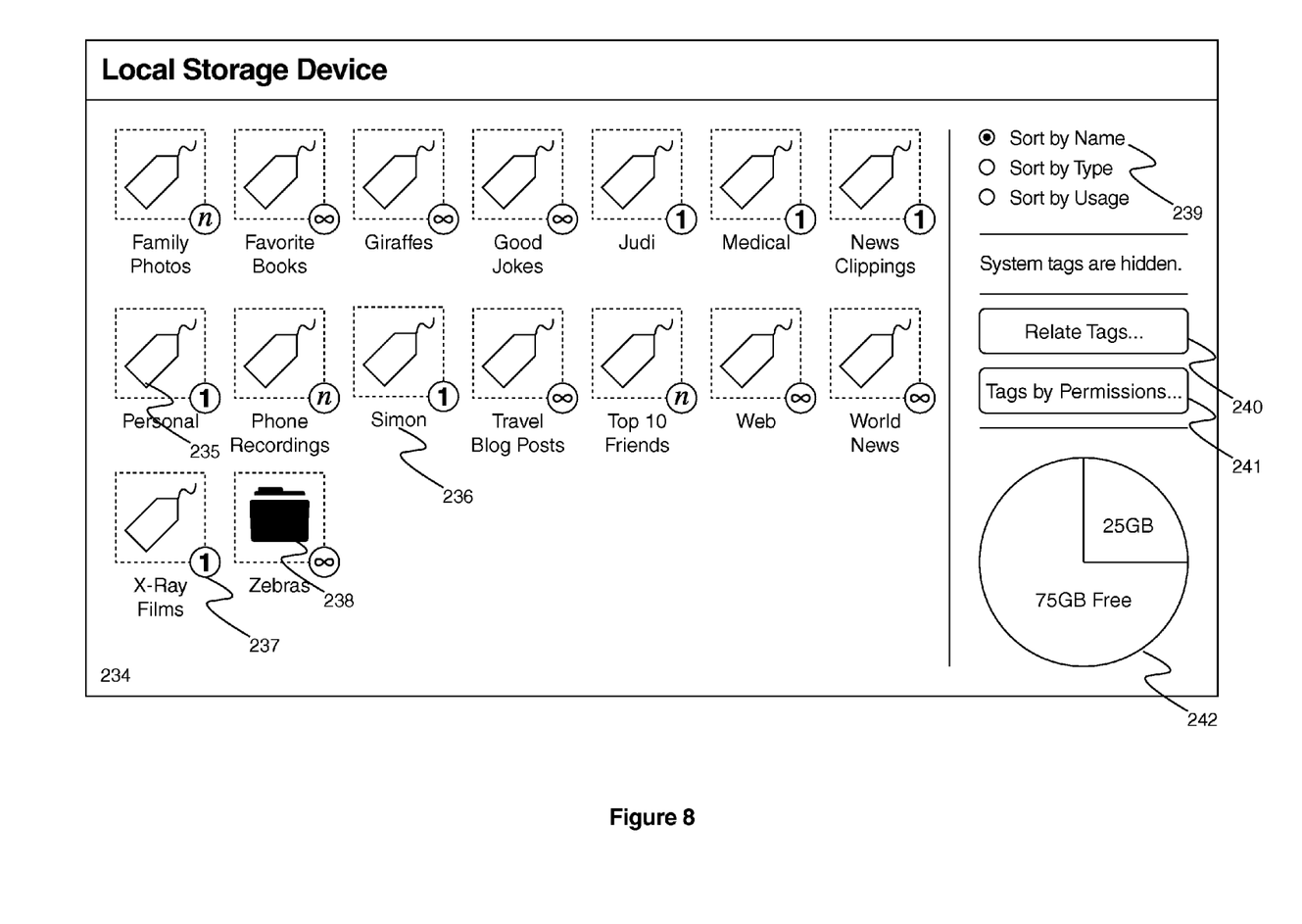
FIG. 8 is a diagram depicting a sample user interface that a person might employ to browse saved data on a tag-based operating system.

FIG. 8 depicts a sample user interface for browsing data on a tag aware operating system 234. In the particular dialog box shown, each tag is represented by an icon 235, a description 236, and a corresponding privacy icon 237. Tags that have been specified as mutually-exclusive (essentially turning them into folders) may be represented by a different icon, such as an icon depicting a folder 238. The layout of tags may be adjusted by selecting ordering options 239. Tags may be related to one another through various logical relationships, or their existing logical relationships may be edited, through a separate dialog box accessed through a user interface control 240. Tags may also be viewed in groups according to the privacy permissions assigned to each tag by the present user though a user interface control 241. The amount of space remaining on a storage device supporting tag storage may also be represented 242 for the convenience of the user.

Figure 9:
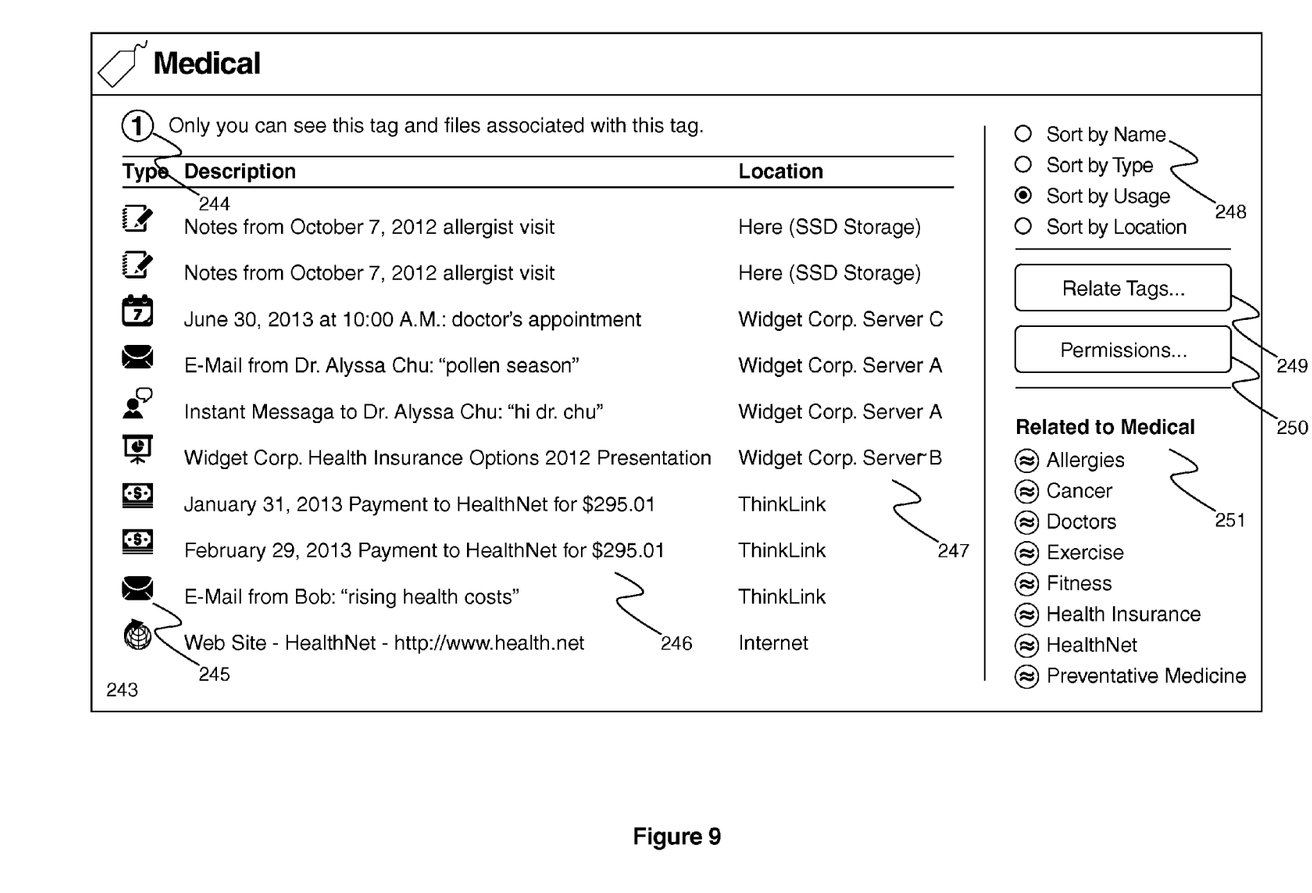
FIG. 9 is a diagram depicting a sample user interface that a person might employ to view details concerning a particular tag on a tag-based operating system.

FIG. 9 depicts a sample user interface for browsing details regarding a particular tag 243. The dialog box may re-present the privacy setting of the tag in a prominent fashion 244, while also listing the data associated with that tag accessible to the present user. Such a listing may include icons representing data type 245, descriptions of each file or data object 246, and the location of each file or data object 247. The order of the listing may be adjusted by selecting ordering options 248. As before, tags may be related to one another through various logical relationships, or their existing logical relationships may be edited, through a separate dialog box accessed through a user interface control 249. Tags may also be viewed according to the privacy permissions assigned to each tag by the present user though a user interface control 250. Tags related to the tag being examined may be displayed in a smaller list 251 or other layout configuration, such as a tag "cloud."

Figure 10:
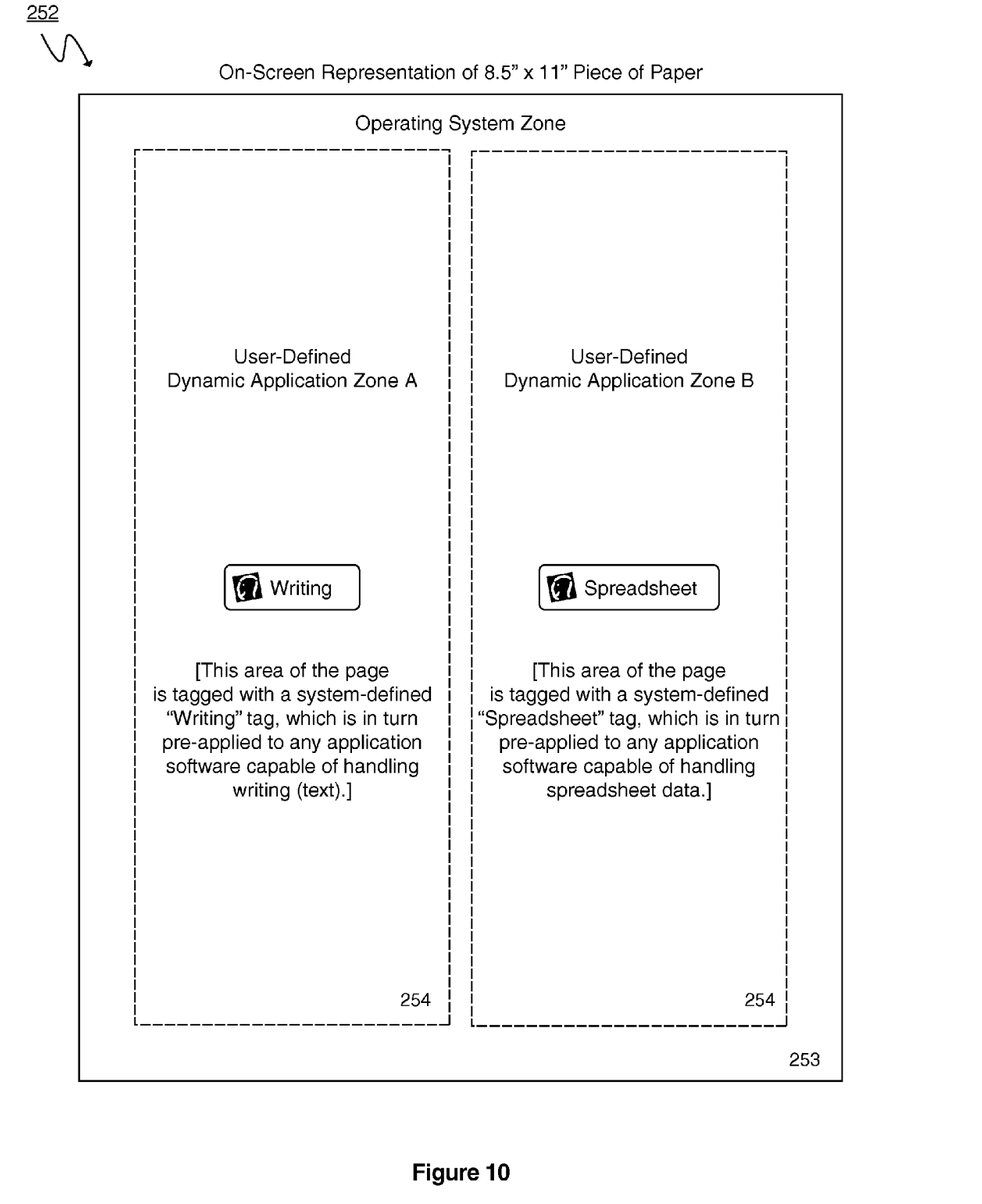
FIG. 10 is a diagram depicting a sample user interface that a person might employ to combine different data types in a single computer file without restricting those data types to associations with specific software tools in a mutually exclusive fashion.

FIG. 10 depicts an on-screen representation of a standard sheet of paper 253 divided into two dynamic application zones 254: the left zone "A" being intended for text, and the right zone "B" being intended for a spreadsheet. Rather than the entire sheet of paper being named with a specific file name and the extension of that file name (e.g. ".DOC") dictating the software application to be used in order to edit the entire digital sheet of paper, the digital sheet of paper may be treated by the operating system as a generic data object having two (or any number of) zones of user-defined dimensions to which system-defined tags have been applied. In turn, these system-defined tags may be associated with one or more software applications capable of interpreting and editing text or spreadsheet data, respectively.

Figure 11:
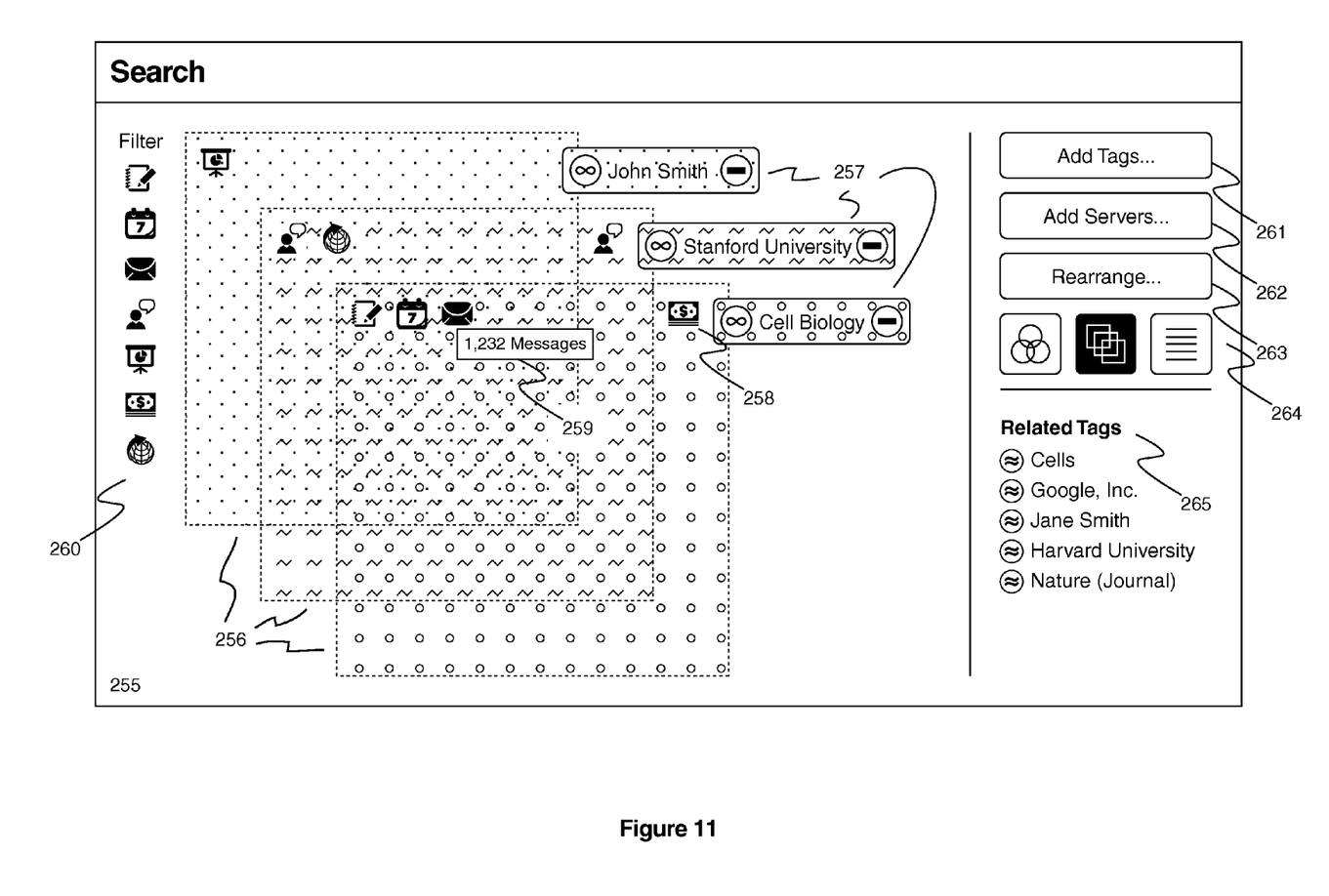
FIG. 11 is a diagram depicting a sample user interface that a person might employ to search for data stored through the use of tags.

FIG. 11 depicts an exemplary data search user interface 255 that allows an individual to find data based upon a finite, user-defined set of tags that such data may already be labeled with 257. The preferred embodiment displays a defined zone corresponding to each tag in the finite set 256, arranged such that the zones overlap with one another, but not completely, so as to make clear areas where there is no overlap, areas where there is only some overlap, and an area where there is complete overlap between all zones. The zones may be square, circular, or otherwise defined in shape. Corresponding with the presence and accessibility of data associated with one or more tags being analyzed, the preferred embodiment displays icons indicating the type of data available 258 in the proper location of the proper area. If not enough space is available on the screen to display the proper icons in, for example, a small overlapping area, in the preferred embodiment, the user may use a mouse to hover over the area and reveal the tags associated with that area, and double-click to zoom in, creating the appearance of additional space. The number of associated results of a certain type may also be shown 259 when a mouse cursor or other operating system pointer is focused on an icon 258. Results may also be filtered by data type 260. The user may add more tags to compare through the use of a designated control, such as a button 261, or in the alternative, add a specific tag server's entire corpus of data to compare through the use of a designated control, such as a button 262. The zones may be rearranged to offer a better view of the search result data through the use of a designated control, such as a button 263. The user may also present the search result information in the form of another shape, or a text-based list, through the operation of a designated control 264. Related tags 265 may also be suggested to add to the search analysis based on the tags already being compared or tags that have been frequently used in the past.

As a person skilled in the art will recognize from the previous detailed description and from the figures and claims, modifications and changes can be made to the preferred embodiments of the invention without departing from the scope of this invention defined in the following claims.

What is claimed is:

1. A method of storing, categorizing and distributing information concerning relationships between data stored on electronic devices, comprising:
    identifying data in need of categorization regardless of location anywhere on a network of devices;
    indicating at least a portion of a desired tag for the data in question;
    transmitting a query to a plurality of network servers, possibly including but not limited to a server operating on the same device originating the query, containing the desired at least partial string in order to determine unique identifiers, if any, for matching and similar tags;
    suggesting any related tags according to existing direct tag-to-tag relationships between tags already defined on each queried server;
    filtering the resulting list of tags on the any number of servers according to privacy rules;
    transmitting the filtered result lists back to the client device;
    aggregating the filtered result lists on the client device;
    choosing the proper unique tag identifiers from the aggregate result list;
    choosing additional tags suggested by the client device based upon the any number of servers' response, as appropriate; and
    storing the tag choices for future use.

2. The method of claim 1, wherein each tag has respective independent permission settings specifying which individuals or groups may apply the respective tag to data, specifying which individuals or groups may view application to data of the respective tag, and specifying which individuals or groups may view data to which the respective tag has been applied.

3. The method of claim 2, wherein certain system-defined tags identify their associated data to an operating system as crucial.

4. The method of claim 2, wherein tags are assigned passwords to control the ability to change access rights, and access rights can be inherited from parent tags.

5. The method of claim 2, wherein privacy rules alter the visual appearance of a tag.

6. The method of claim 1, wherein files with identical names, including null names, are distinguishable by their respective independent tag associations, wherein such files reside in the same hierarchical division of a filesystem.

7. The method of claim 1, wherein tags are associated with other tags in specific manners selected from the group consisting of equal, roughly equivalent, subset, superset, and null, to form ontologies and hierarchies editable by a multitude of individuals subject to privacy rules associated with each tag through the use of a network.

8. The method of claim 7, wherein tags of the same user-defined hierarchical level function as a column headings in a table such that data entered on a row-by-row basis is stored on a server as key-value pairs, with each key corresponding to a tag's given unique identifier.

9. The method of claim 1, wherein a tag is assigned a reversible property requiring that associated data not be simultaneously tagged with any other tag.

10. The method of claim 1, wherein the number of individuals who, without having initially tagged a given piece of data, approve or disapprove of the accuracy of a tag's relationship to a giventhat same piece of data is recorded by a tally of votes independent of the frequency of the tag's usage, optionally displayed alongside the tag.

11. The method of claim 10, wherein tag-data relationships with negative vote tallies are automatically dissociated from the underlying data.

12. The method of claim 10, wherein tag-data relationships with negative vote tallies have an appearance altered for the purpose of avoiding notice.

13. The method of claim 10, wherein tag-data relationships with positive vote tallies have an appearance altered for the purpose of encouraging notice.

14. The method of claim 1, wherein arithmetic operations are automatically performed upon numeric data sharing a common tag.

15. The method of claim 1, wherein a proper subset of a digital representation of any space is designated as being related to at least one system-defined tag corresponding to a computer software application, such that multiple software applications can be used to edit proper subsets of a document.

16. The method of claim 1, wherein the unique identifiers are hidden from the end user such that they are automatically associated with specific tags.

17. The method of claim 1, wherein the client device determines a hash value of data on the client device such that it may be compared with the last known hash value of the corresponding data on a remote server, and upon detecting a difference, segments the data into chunks of a specified length.

18. The method of claim 17, wherein the hash of each chunk of data is used to determine which parts of a file have changed, such that only those portions of the file are selectively synchronized with a remote server.

19. The method of claim 1, wherein a device automatically applies as tags all of those node names comprising the path of an end node in a hierarchical data structure, optionally excluding the root node.

20. The method of claim 1, wherein any server can offer as a service a configurable Application Programming Interface (API) that allows its list of tags to be referenced in software applications, mobile applications, web sites or other such electronic products exogenous to that server.

21. A method for automatically tagging data based upon the contents thereof and the origin of such data, comprising:
   downloading a file from a remote server;
   analyzing the origin of the file based upon criteria including, but not limited to, the domain name of the remote server;
   querying a relational database for information about the given domain name;
   selecting tags corresponding to the resulting information concerning the given domain name;
   selecting tags based upon the contents of the file;
   if necessary, automatically transmitting the file to a device supporting tag-based storage;
   suggesting the selected tags to a user; and
   storing the tags deemed appropriate by the user for future use.

22. The method of claim 21, wherein the information concerning the domain name used to select tags relates to the domain name's owner.

23. A system for storing, categorizing and distributing information concerning relationships between data, comprising:
   a plurality of network servers, wherein each network server stores at least one list of tags, wherein each tag is associated with a unique identifier that uniquely identifies the tag;
   one or more client devices, each connected to the plurality of network servers;
   wherein each client device is configured to:
      transmit a query string to the plurality of network servers in order to determine unique identifiers, if any, for matching and similar tags;
   wherein each network server is configured to:
      suggest related tags according to existing direct tag-to-tag relationships between tags already defined on the network server;
      filter the resulting list of tags according to privacy rules; and
      transmit the filtered result list back to the client device;
   wherein the client device aggregates the filtered result lists from the plurality of network servers;
   wherein each client device is further configured to:
      choose the proper unique tag identifiers from the aggregate result list;
      choose additional tags suggested the client device based upon the plurality of servers' responses; and
      store the tag choices for future use.

* * * * *